United States Patent

Florendo et al.

(10) Patent No.: US 10,698,921 B2
(45) Date of Patent: Jun. 30, 2020

(54) PERSISTENCE AND INITIALIZATION OF SYNCHRONIZATION STATE FOR SERIALIZED DATA LOG REPLAY IN DATABASE SYSTEMS

(71) Applicant: SAP SE, Walldorf (DE)

(72) Inventors: Colin Florendo, Boston, MA (US); Michael Muehle, Walldorf (DE); Thorsten Glebe, Walldorf (DE); Rolando Blanco, Waterloo, CA (US); Chaitanya Gottipati, Bangalore (IN); Nirvik Basak, Bangalore (IN); Günter Radestock, Walldorf (DE)

(73) Assignee: SAP SE, Walldorf (DE)

( * ) Notice: Subject to any disclaimer, the term of this patent is extended or adjusted under 35 U.S.C. 154(b) by 369 days.

(21) Appl. No.: 15/445,505

(22) Filed: Feb. 28, 2017

(65) Prior Publication Data

US 2018/0246947 A1 Aug. 30, 2018

(51) Int. Cl.
*G06F 16/27* (2019.01)
*G06F 16/23* (2019.01)

(52) U.S. Cl.
CPC ........ *G06F 16/273* (2019.01); *G06F 16/2343* (2019.01); *G06F 16/2379* (2019.01)

(58) Field of Classification Search
CPC ............. G06F 11/1471; G06F 16/2365; G06F 16/2343; G06F 11/1662; G06F 16/1774; G06F 16/27; G06F 16/273; G06F 16/24552
See application file for complete search history.

(56) References Cited

U.S. PATENT DOCUMENTS

| | | | | |
|---|---|---|---|---|
| 8,572,051 B1* | 10/2013 | Chen | ............... | G06F 16/24532 707/687 |
| 2002/0174108 A1* | 11/2002 | Cotner | ............... | G06F 11/1474 707/999.003 |
| 2003/0004970 A1* | 1/2003 | Watts | ............... | G06F 16/2343 707/999.2 |
| 2008/0222159 A1* | 9/2008 | Aranha | ............... | G06F 16/21 707/999.01 |
| 2013/0080388 A1* | 3/2013 | Dwyer | ............... | G06F 16/24552 707/634 |
| 2014/0279855 A1* | 9/2014 | Tan | ............... | G06F 16/2228 707/609 |
| 2015/0242400 A1* | 8/2015 | Bensberg | ............... | G06F 16/2282 707/615 |
| 2016/0147859 A1* | 5/2016 | Lee | ............... | G06F 16/27 707/615 |

* cited by examiner

*Primary Examiner* — Yuk Ting Choi
(74) *Attorney, Agent, or Firm* — Jones Day

(57) ABSTRACT

A computer implemented method for initializing a secondary database system includes receiving table state information from a primary database system at a secondary database system. The table state information includes information identifying which tables had an open operation during a savepoint event. Metadata associated with the tables is parsed to identify table state information from the metadata and a lock is created for each table identified as having an open operation during the savepoint event. Afterwards, log transaction information is sequentially parsed. Related apparatus, systems, techniques and articles are also described.

20 Claims, 9 Drawing Sheets

PERSISTENCE AND INITIALIZATION OF SYNCHRONIZATION STATE FOR SERIALIZED DATA LOG REPLAY IN DATABASE SYSTEMS

TECHNICAL FIELD

The subject matter described herein relates to a mechanism for persistence and initialization of a synchronization state for serialized data log replay to initialize a secondary database system to a state such that it reflects the state of a primary database system.

BACKGROUND

Database systems rely on data replication and synchronization to maintain continuous system availability. Typically, in such a system, a complete copy of the database is stored at a first database system and the same complete copy of the database is stored at a second database system. The first and second database systems may be in different locations. Since the data in the second database system needs to be the same as the data in the first database system, a synchronization mechanism is typically employed to handle synchronization of the data. If there is a failure associated with the first database system, the overall system can switch to using the second database system without significant issues.

Since the second database system may be asked to perform all of the same tasks as the first database system, typically, the second database system has the same hardware and software requirements as the first database system. Sometimes more than two database systems may be included within the overall system.

SUMMARY

In some aspects initializing a secondary database system may include receiving table state information from a primary database system at a secondary database system. The table state information may include information identifying which tables had an open operation during a savepoint event. Metadata associated with the tables is parsed to identify table state information from the metadata and a lock created for each table identified as having an open operation during the savepoint event. Afterwards, log transaction information may be sequentially parsed.

In some aspects, the savepoint event may occur during execution of an operation comprising a plurality of sub-operations. The operation may be a data definition language (DDL) query.

The log transaction information may include transactions since the savepoint event and the log transaction information may include a transaction to terminate the lock created for each table identified as having an open operation during the savepoint event.

In some aspects, the method may be executed during initialization of the secondary database system.

In some aspects, the log transaction information may be generated by the primary database system based on queries received by the primary database system since the savepoint event.

The primary database system and the secondary database system may be configured to operate in a load balancing operation.

In some aspects, the primary database system and the secondary database system may be in memory database (IMDB) systems and the secondary database system may be configured as a back-up database system. The primary database system and the secondary database system may be column oriented database systems.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods may be implemented by one or more data processors either within a single computing system or distributed among two or more computing systems. Such computing systems may be connected and may exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the mechanism described herein may facilitate the ability to initialize a second database system and therefore simultaneously utilize a first database system and a second database system, in a load balancing operation. In some embodiments, this may facilitate better utilization of hardware (e.g., processors and memory) associated with the database systems.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

A database or database system may be represented as a table or a set of tables containing data in rows and/or columns. In a row based database, data in a table may be stored and organized by rows. Alternatively, data in a table may also be stored and organized by columns and such a database is called a column oriented database or a columnar database. Column oriented databases typically make more efficient use of storage by replacing redundant data with a pointer. One example of a database system is SAP HANA®. SAP HANA® is a column oriented relational database system. SAP HANA® is also an in memory database (IMDB) in which the data associated with the database is stored in main memory instead of a disk storage (persistent memory) so it may be accessed more quickly. IMDB systems are generally column oriented databases since column oriented databases make more efficient use of the expensive main memory. In some situations, persistent memory may be used to store certain data (e.g., data that is not used as frequently or has not been used in some time).

Some databases may utilize replication to improve reliability and availability of the database. If data replication is implemented, the database system may include a first database system and a second database system. The first database system may include a processor and memory sufficient to store the data associated with the database. The first database system may store a first (primary) copy of the data associated with the database. The second database system may also include a processor and memory sufficient to store the data associated with the database. The second database system may store a second (backup) copy of the data associated with the database.

To better utilize the second database system, some database systems, such as SAP HANA®, may simultaneously utilize the first database system and the second database system. In this mode of operation, the first database system may be configured to delegate certain queries to the second database system to balance the load between the two systems. Such a situation may be referred to as Active/Active (AA) operation since the first database system and the second database system both actively respond to queries at the same time.

Since the first database system and the second database system are both responding to queries at the same time, it may be desirable to implement a replication procedure that ensures the data in the secondary database is current with the data in the primary database or at least current with the primary database after a short delay. If the data between the two database systems is not sufficiently current, inconsistent responses to client queries may be generated. Additionally, it may be desirable for the data in the main memory of the database systems to be current since retrieval of information from persistent memory may take longer.

Figure 1:
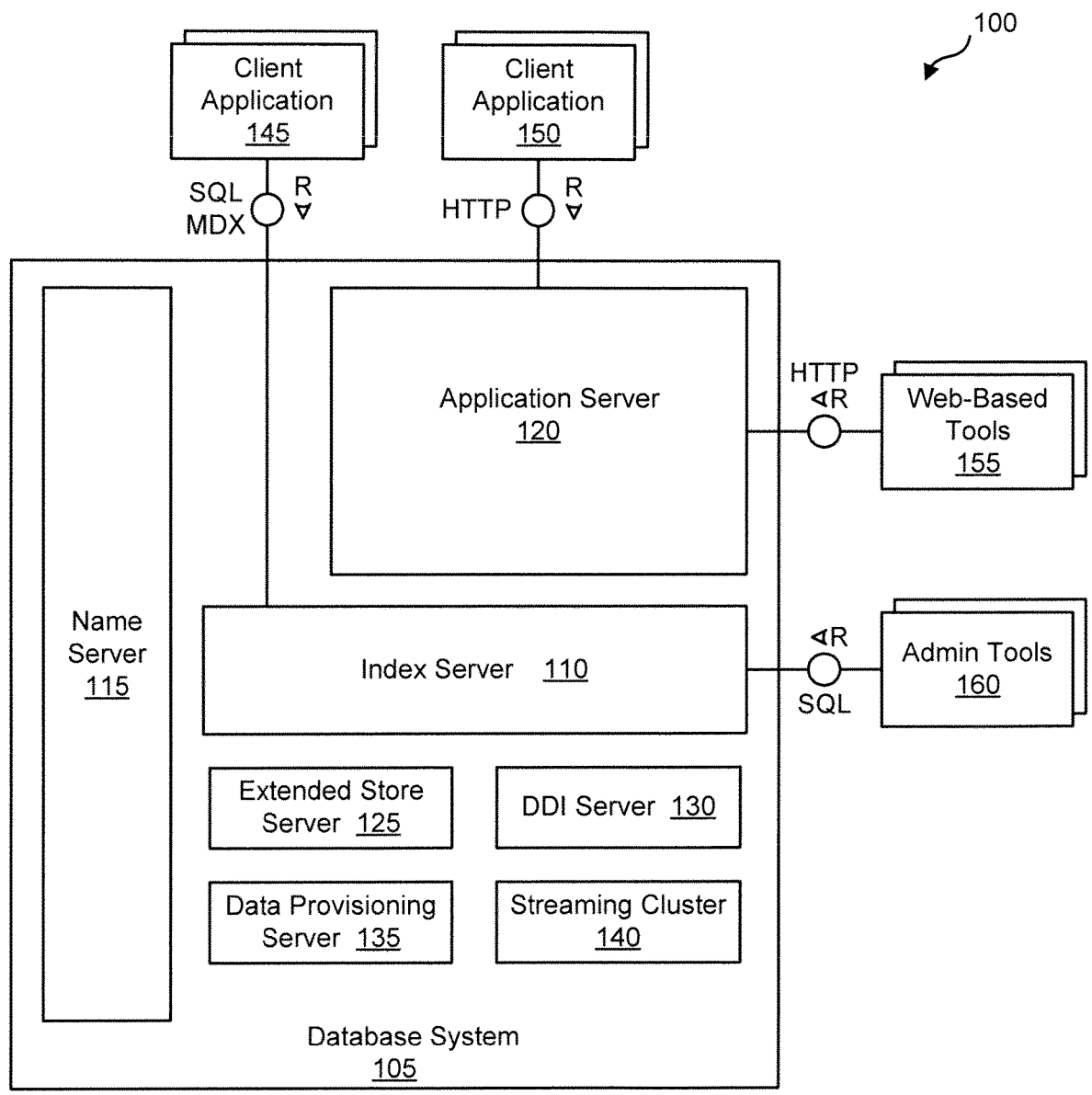
FIG. 1 is a system diagram illustrating an example database system for use in connection with the current subject matter.

FIG. 1 is a diagram 100 illustrating a database system 105 that may be used to implement aspects of the current subject matter. The database system 105 may, for example, be an in-memory database in which all relevant data is kept in main memory so that read operations may be executed without disk I/O operations which are required by disk storage to make any changes durable. The database system 105 may include a plurality of servers including, for example, one or more of an index server 110, a name server 115, and/or an application server 120. The database system 105 may also include one or more of an extended store server 125, a database deployment infrastructure (DDI) server 130, a data provisioning server 135, and/or a streaming cluster 140. The database system 105 may be accessed by a plurality of remote clients 145, 150 via different protocols such as SQL/MDX (e.g., by way of the index server 110) and/or web-based protocols such as HTTP (e.g., by way of the application server 120).

The index server 110 may contain in-memory data stores and engines for processing data. The index server 110 may also be accessed by remote tools (e.g., via, for example, SQL queries), that may provide various development environment and administration tools. Additional details regarding an example implementation of the index server 110 are described and illustrated in connection with diagram 300 of FIG. 3.

The name server 115 may own information about the topology of the database system 105. In a distributed database system, the name server 115 may know where various components are running and which data is located on which server. In a database system 105 with multiple database containers, the name server 115 may have information about existing database containers and it may also host the system database. For example, the name server 115 may manage the information about existing tenant databases. Unlike a name server 115 in a single-container system, the name server 115 in a database system 105 having multiple database containers may not store topology information such as the location of tables in a distributed database. In a multi-container database system 105 such database-level topology information may be stored as part of the catalogs of the tenant databases.

The application server 120 may enable native web applications used by one or more remote clients 150 accessing the database system 105 via a web protocol such as HTTP. The application server 120 may allow developers to write and run various database applications without the need to run an additional application server. The application server 120 may also be used to run web-based tools 155 for administration, life-cycle management, and development. Other administration and development tools 160 may directly access the index server 110 for, example, via SQL and other protocols.

The extended store server 125 may be part of a dynamic tiering option that may include a high-performance disk-based column store for very big data up to the petabyte range and beyond. Less frequently accessed data (for which is it non-optimal to maintain in main memory of the index server 110) may be put into the extended store server 125. The dynamic tiering of the extended store server 125 allows for hosting of very large databases with a reduced cost of ownership as compared to conventional arrangements.

The DDI server 130 may be a separate server process that is part of a database deployment infrastructure (DDI). The DDI may be a layer of the database system 105 that simplifies the deployment of database objects using declarative design time artifacts. DDI may ensure a consistent deployment, for example by guaranteeing that multiple objects are deployed in the right sequence based on dependencies, and by implementing a transactional all-or-nothing deployment.

The data provisioning server 135 may provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (e.g., data feeds, etc.) to be utilized by the database system 105. The streaming cluster 140 allows for both consumption of data streams and for complex event processing.

Figure 2:
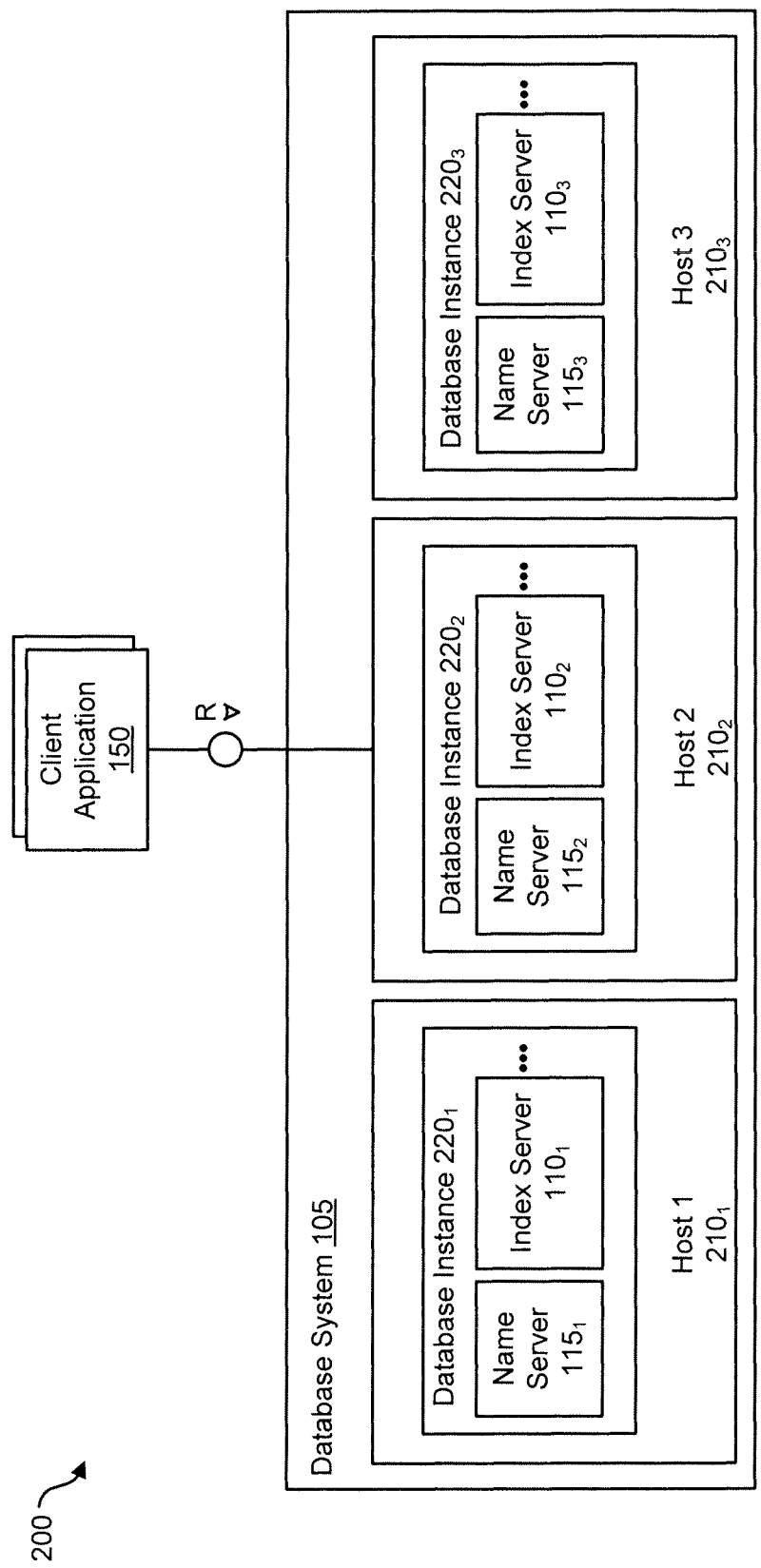
FIG. 2 is a system diagram illustrating a distributed database system having a plurality of database instances.

FIG. 2 is a diagram 200 illustrating a variation of the database system 105 that may support distribution of server components across multiple hosts for scalability and/or availability purposes. This database system 105 may, for example, be identified by a single system ID (SID) and it may be perceived as one unit from the perspective of an administrator, who may install, update, start up, shut down, or backup the system as a whole. The different components of the database system 105 may share the same metadata, and requests from client applications 150 may can be transparently dispatched to different servers $110_{1-3}$, $120_{1-3}$, in the system, if required.

As is illustrated in FIG. 2, the distributed database system 105 may be installed on more than one host $210_{1-3}$. Each host $210_{1-3}$ is a machine that may comprise at least one data processor (e.g., a CPU, etc.), memory, storage, a network interface, and an operation system and which executes part of the database system 105. Each host $210_{1-3}$ may execute a database instance $220_{1-3}$ which comprises the set of components of the distributed database system 105 that are installed on one host $210_{1-3}$. FIG. 2 shows a distributed system with three hosts, which each run a name server $115_{1-3}$, index server $110_{1-3}$, and so on (other components are omitted to simplify the illustration).

Figure 3:
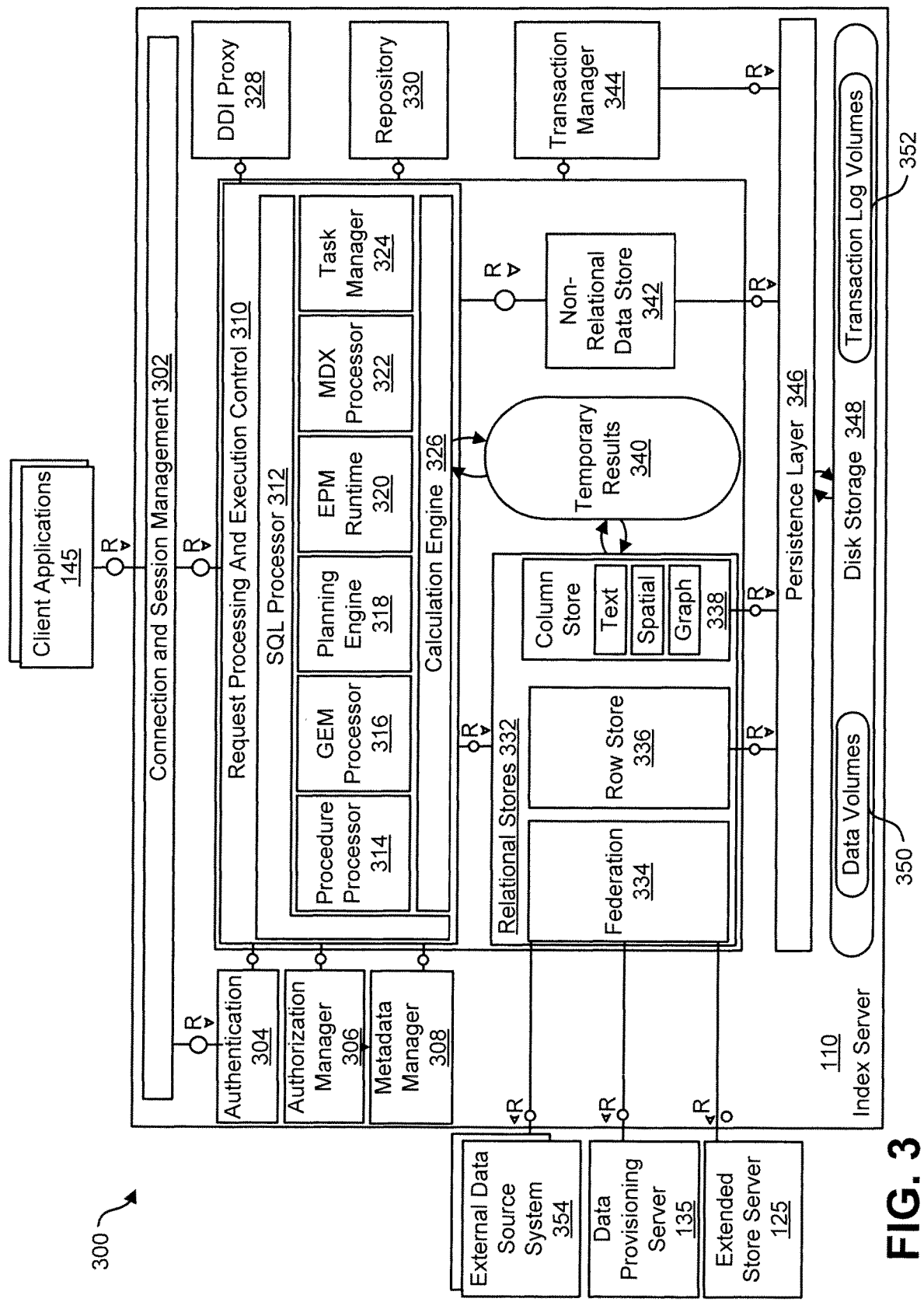
FIG. 3 is a system diagram of an index server forming part of the database system of FIG. 1.

FIG. 3 is a diagram 300 illustrating an architecture for the index server 110 (which may, as indicated above, be one of many instances). A connection and session management component 302 may create and manage sessions and connections for the client applications 145. For each session, a set of parameters may be maintained such as, for example, auto commit settings or the current transaction isolation level.

Requests from the client applications 145 may be processed and executed by way of a request processing and execution control component 310. The database system 105 offers rich programming capabilities for running application-specific calculations inside the database system. In addition to SQL, MDX, and WIPE, the database system 105 may provide different programming languages for different use cases. SQLScript may be used to write database procedures and user defined functions that may be used in SQL statements. L language may be used to implement operator logic that may be called by SQLScript procedures and for writing user-defined functions.

Once a session is established, client applications 145 typically use SQL statements to communicate with the index server 110 which may be handled by a SQL processor 312 within the request processing and execution control component 310. Analytical applications may use the multidimensional query language MDX (MultiDimensional eXpressions) via an MDX processor 322. For graph data, applications may use GEM (Graph Query and Manipulation) via a GEM processor 316, a graph query and manipulation language. SQL statements and MDX queries may be sent over the same connection with the client application 145 using the same network communication protocol. GEM statements may be sent using a built-in SQL system procedure.

The index server 110 may include an authentication component 304 that may be invoked when a new connection with a client application 145 is established. Users may be authenticated either by the database system 105 itself (login with user and password) or authentication may be delegated to an external authentication provider. An authorization manager 306 may be invoked by other components of the database system 105 to check whether the user has the required privileges to execute the requested operations.

Statements may be processed in the context of a transaction. New sessions may be implicitly assigned to a new transaction. The index server 110 may include a transaction manager 344 that coordinates transactions, controls transactional isolation, and keeps track of running and closed transactions. When a transaction is committed or rolled back, the transaction manager 344 may inform the involved engines about this event so they may execute necessary actions. The transaction manager 344 may provide various types of concurrency control and it may cooperate with a persistence layer 346 to achieve atomic and durable transactions.

Incoming SQL requests from the client applications 145 may be received by the SQL processor 312. Data manipulation statements may be executed by the SQL processor 312 itself. Other types of requests may be delegated to the respective components. Data definition statements may be dispatched to a metadata manager 306, transaction control statements may be forwarded to the transaction manager 344, planning commands may be routed to a planning engine 318, and task related commands may forwarded to a task manager 324 (which may be part of a larger task framework) Incoming MDX requests may be delegated to the MDX processor 322. Procedure calls may be forwarded to the procedure processor 314, which further dispatches the calls, for example to a calculation engine 326, the GEM processor 316, a repository 300, or a DDI proxy 328.

The index server 110 may also include a planning engine 318 that allows planning applications, for instance for financial planning, to execute basic planning operations in the database layer. One such basic operation is to create a new version of a data set as a copy of an existing one while applying filters and transformations. For example, planning data for a new year may be created as a copy of the data from the previous year. Another example for a planning operation is the disaggregation operation that distributes target values from higher to lower aggregation levels based on a distribution function.

The SQL processor 312 may include an enterprise performance management (EPM) runtime component 320 that may form part of a larger platform providing an infrastructure for developing and running enterprise performance management applications on the database system 105. While the planning engine 318 may provide basic planning operations, the EPM platform provides a foundation for complete planning applications, based on application-specific planning models managed in the database system 105.

The calculation engine 326 may provide a common infrastructure that implements various features such as SQLScript, MDX, GEM, tasks, and planning operations. The SQLScript processor 312, the MDX processor 322, the planning engine 318, the task manager 324, and the GEM processor 316 may translate the different programming languages, query languages, and models into a common representation that is optimized and executed by the calculation engine 326. The calculation engine 326 may implement those features using temporary results 340 which may be based, in part, on data within the relational stores 332.

Metadata may be accessed via the metadata manager component 308. Metadata, in this context, may comprise a variety of objects, such as definitions of relational tables, columns, views, indexes and procedures. Metadata of all these types may be stored in one common database catalog for all stores. The database catalog may be stored in tables in a row store 336 forming part of a group of relational stores 332. Other aspects of the database system 105 including, for example, support and multi-version concurrency control may also be used for metadata management. In distributed systems, central metadata may be shared across servers and the metadata manager 308 may coordinate or otherwise manage such sharing.

The relational stores 332 form the different data management components of the index server 110 and these relational stores may, for example, store data in main memory. The row store 336, a column store 338, and a federation component 334 are all relational data stores which may provide access to data organized in relational tables. The column store 338 may store relational tables column-wise (i.e., in a column-oriented fashion, etc.). The column store 338 may also comprise text search and analysis capabilities, support for spatial data, and operators and storage for graph-structured data. With regard to graph-structured data, from an application viewpoint, the column store 338 may be viewed as a non-relational and schema-flexible in-memory data store for graph-structured data. However, technically such a graph store is not a separate physical data store. Instead it is built using the column store 338, which may have a dedicated graph API.

The row store 336 may store relational tables row-wise. When a table is created, the creator may specify whether it should be row or column-based. Tables may be migrated between the two storage formats. While certain SQL extensions are only available for one kind of table (such as the "merge" command for column tables), standard SQL may be used on all tables. The index server 110 also provides functionality to combine both kinds of tables in one statement (join, sub query, union).

The federation component 334 may be viewed as a virtual relational data store. The federation component 334 may provide access to remote data in external data source system(s) 354 through virtual tables, which may be used in SQL queries in a fashion similar to normal tables.

The database system 105 may include an integration of a non-relational data store 342 into the index server 110. For example, the non-relational data store 342 may have data represented as networks of C++ objects, which may be persisted to disk. The non-relational data store 342 may be used, for example, for optimization and planning tasks that operate on large networks of data objects, for example in supply chain management. Unlike the row store 336 and the column store 338, the non-relational data store 342 does not use relational tables; rather, objects may be directly stored in containers provided by the persistence layer 346. Fixed size entry containers may be used to store objects of one class. Persisted objects may be loaded via their persisted object IDs, which may also be used to persist references between objects. In addition, access via in-memory indexes is supported. In that case, the objects need to contain search keys. The in-memory search index is created on first access. The non-relational data store 342 may be integrated with the transaction manager 344 to extend transaction management with sub-transactions, and to also provide a different locking protocol and implementation of multi version concurrency control.

An extended store is another relational store that may be used or otherwise form part of the database system 105. The extended store may, for example, be a disk-based column store optimized for managing very big tables, which may not be desirable to keep in memory (as with the relational stores 332). The extended store may run in an extended store server 125 separate from the index server 110. The index server 110 may use the federation component 334 to send SQL statements to the extended store server 125.

The persistence layer 346 is responsible for durability and atomicity of transactions. The persistence layer 346 may ensure that the database system 105 is restored to the most recent committed state after a restart and that transactions are either completely executed or completely undone. To achieve this goal in an efficient way, the persistence layer 346 may use a combination of write-ahead logs, shadow paging and savepoints. The persistence layer 346 may provide interfaces for writing and reading persisted data and it may also contain a logger component that manages a transaction log. Transaction log entries can be written explicitly by using a log interface or implicitly when using the virtual file abstraction.

The persistence layer 346 stores data in persistent disk storage 348 which, in turn, may include data volumes 350 and/or transaction log volumes 352 that may be organized in pages. Different page sizes may be supported, for example, between 4 k and 16M. Data may be loaded from the disk storage 348 and stored to disk page wise. For read and write access, pages may be loaded into a page buffer in memory. The page buffer need not have a minimum or maximum size, rather, all free memory not used for other things may be used for the page buffer. If the memory is needed elsewhere, least recently used pages may be removed from the cache. If a modified page is chosen to be removed, the page first needs to be persisted to disk storage 348. While the pages and the page buffer are managed by the persistence layer 346, the in-memory stores (i.e., the relational stores 332) may access data within loaded pages.

In some applications, database systems may be required to support operations on a 24/7 schedule, and data system providers may be required to guarantee a maximum amount of downtime, that is time during which a system is not able to fully support ongoing operations. When a system is required to ensure an agreed level of operational performance, it may be referred to as a high availability ("HA") system. As discussed above, one solution to guarantee substantially continuous uptime with no, or very little, downtime is to maintain one or more hot-standby systems (sometimes referred to as a secondary database system or a back-up system). A hot-standby system is a system that may be activated quickly in the event of a disruption causing one or more functions of a primary operational data system to fail. Such a disruption may be referred to as a disaster, and the process of restoring a data system to full operations may be referred to as disaster-recovery ("DR").

In some embodiments, the secondary database system may be an exact replica of a primary operational database system that is capable of providing all or substantially all of the functions provided by the primary database system. Alternatively, the secondary system may be a system that is capable of providing a minimum amount of essential functionality during the time required to restore the primary database system. The time it takes after a disaster to restore full, or minimum, functionality of a database system, for example by bringing the secondary database system online, is referred to as recovery time. In an effort to minimize recovery time, and thereby downtime, a hot-standby system is typically in a state just short of fully operational. For example, a system architecture may be implemented in which all functional systems of the secondary database system are active and operational, and all system and data changes or updates occur in the primary database system and the secondary database system at the exact same time. In such a case the only difference in the two systems may be that the primary is configured to respond to user requests and the secondary is not. In other systems one or more functions may be disabled until mission critical systems of the secondary database system are observed to be operating normally, at which time the remaining functions may be brought online.

In some applications, database systems may be required to provide prompt responses to users and applications that rely on the data managed by the database system. Providers and designers of database systems may be required to guarantee a minimum average throughput over time, or an average maximum response time. The speed with which a database system responds to a request from a user or an application may be dependent on many factors, but, in general, systems are limited in the number of requests they can handle in a given period of time. When a database system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing and HA systems is that they may require additional processing systems, which in turn have a high cost. It is often the case with certain database systems supporting critical functions of an organization that additional systems are needed to perform both load balancing and HA functionality to efficiently support continuous operations. Given the redundant nature of DR systems, they are often left undisturbed unless a disaster occurs. Thus, in some circumstances, it is desirable to implement and maintain a combination high availability/disaster recovery (HA/DR) system with load balancing that includes both a primary database system and a secondary (hot-standby) database system, and potentially one or more tertiary systems. Such a combination system allows for load balancing of workload between the processing systems of both the primary database system and the secondary database system, without disrupting the ability of the HA/DR system to assume primary functionality in the event of a disaster.

Figure 4:
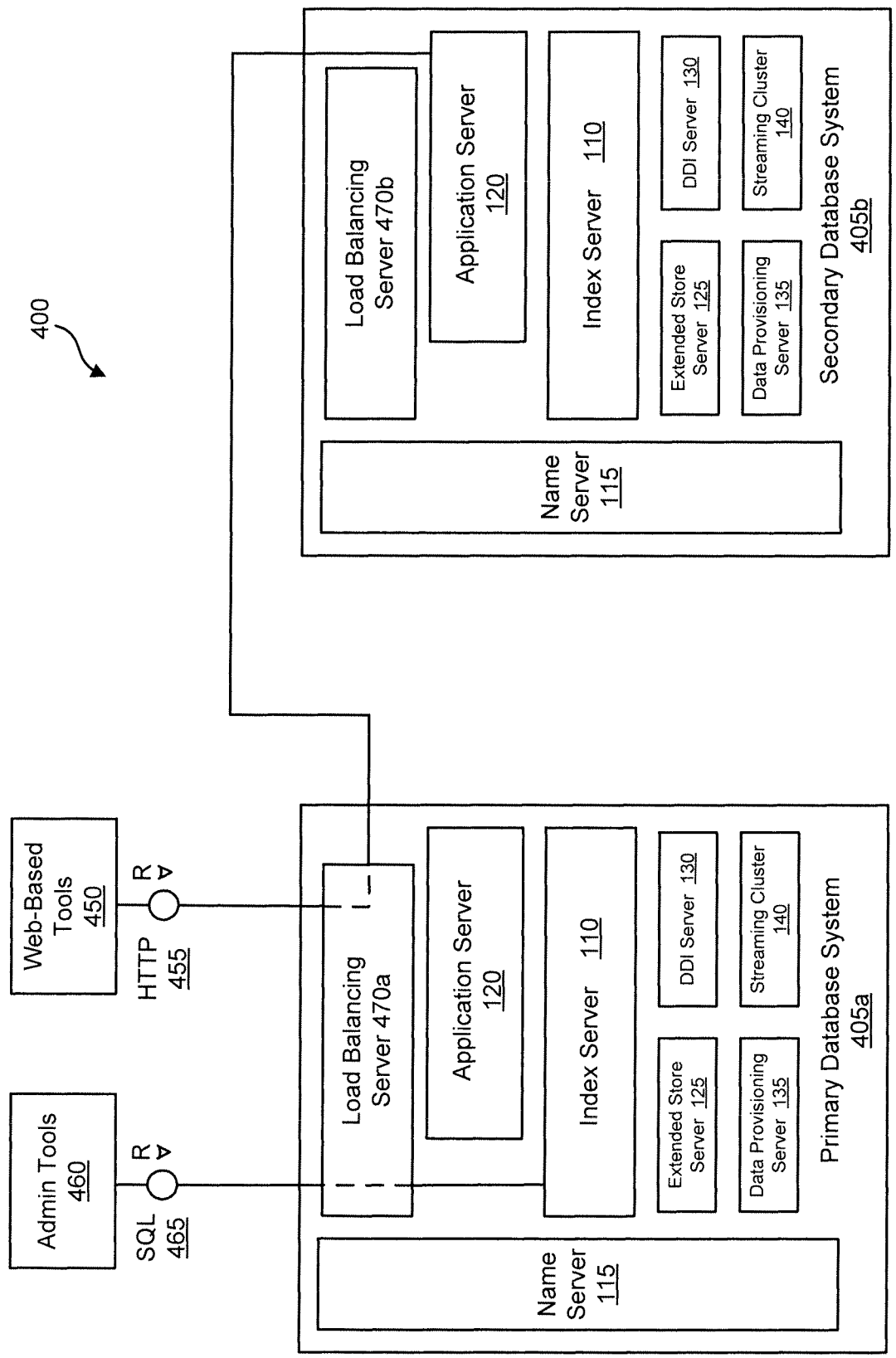
FIG. 4 is a system diagram illustrating an architecture to support load balancing between a primary database system and a secondary database system.

FIG. 4 is a functional flow diagram illustrating an architecture 400 to support load balancing between a primary database system 405a and a secondary database system 405b, which serves as a hot-standby to primary database system 405a. Both the primary database system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary database system 405a and secondary database system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary database system 405a, sending requests to the secondary database system 405b as necessary to maintain a well distributed workload.

As depicted in FIG. 4, each of the primary database system 405a and the secondary database system 405b includes a load balancing server 470a and 470b which respectively receive requests from user applications directed to the primary database system 405a or the secondary database system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary database system 405a, while routing an HTTP request 455 from web-based tools 450 to the application server 120 of the secondary database system 405b.

Load balancing of resources between a primary database system 405a and a secondary database system 405b may give rise to a number of complicating issues. For example, if either of the requests 455, 465 requires writing to one or more data tables, or modifying a data table, then the two database systems 405a, 405b will diverge. After many instances of write requests being distributed between the primary database system 405a and the secondary database system 405b, the two systems would be substantially different, and likely unusable. In another example, an application request, e.g. 465, may perform a write transaction that is followed by a read transaction, e.g. 455, related to the data written by the write request 465. If the write request is allocated to the primary database system 405a, the read request would obtain a different result depending on whether the subsequent read transaction is carried out by the primary database system 405a or by the secondary database system 405b.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary database system and a backup database system must maintain the backup system in an identical, or nearly identical, state as the primary system. Such a solution should also avoid or prohibit any actions which may cause the state of the backup database system to substantially diverge from the state of the primary database system. In this way, in the event of a partial or total failure of the primary database system due to disaster, the backup database system can failover to a primary database system mode with minimal or no impact to client applications.

Figure 5:
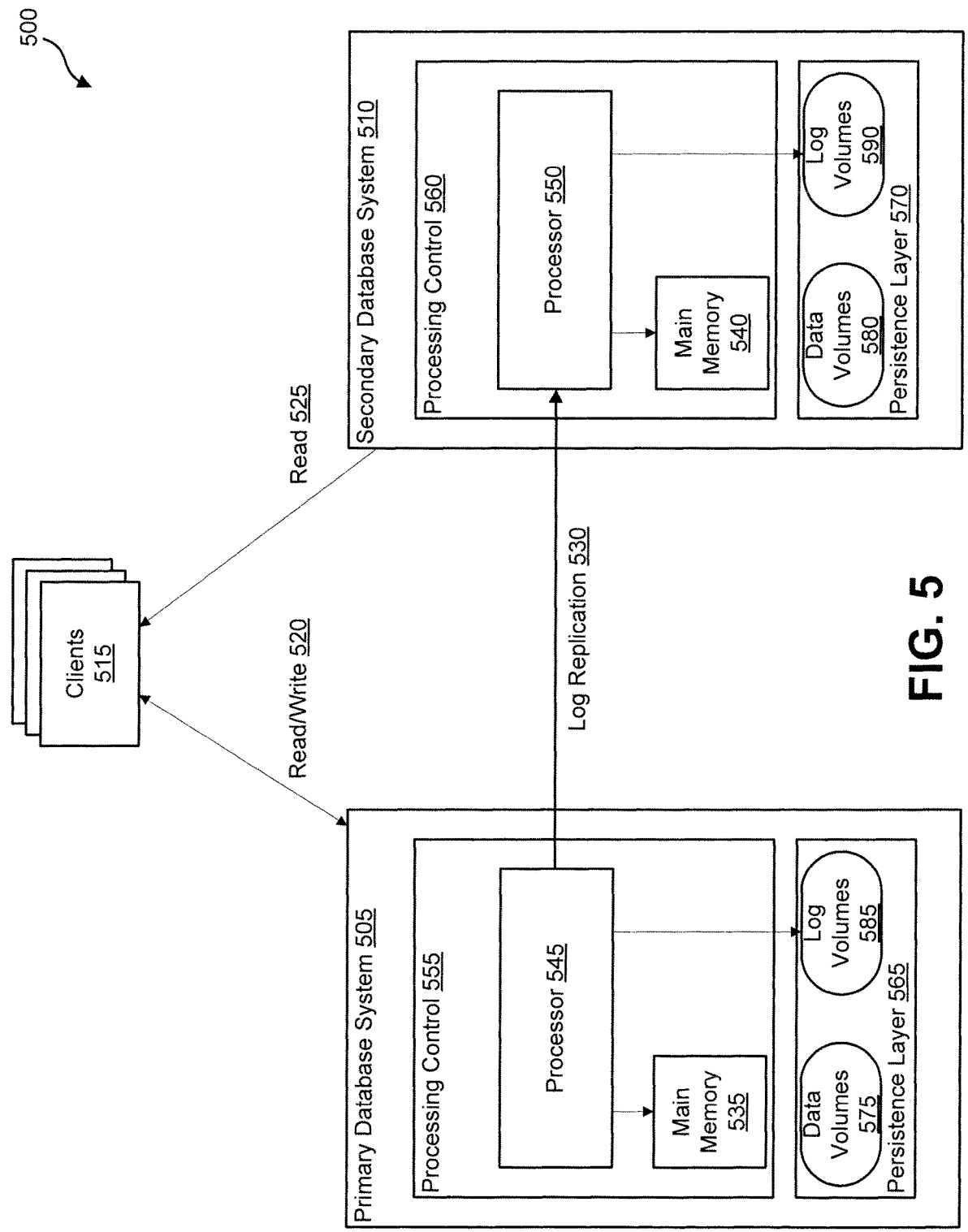
FIG. 5 is a system diagram for illustrating a solution for managing load balancing in a high availability system.

FIG. 5 depicts one possible solution to managing load balancing in a HA/DR system 500. HA/DR system 500 includes a primary database system 505 and a secondary database system 510 and is capable of load balancing between primary database system 505 and secondary database system 510 without interfering with the hot-standby functionality of the secondary database system 510. Each of primary database system 505 and secondary database system 510 may be single instance database systems similar to database system 105 depicted in FIG. 1, or a distributed variation of database system 105 as depicted in FIG. 2. Furthermore, each of primary database system 505 and secondary database system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary database system 505 and the secondary database system 525. For example, client 515 maintains a read/write connection 520 to the primary database system 505 and a read only connection 525 to the secondary database system 510. Alternatively, client 515 may maintain a read/write connection with each of the primary database system 505 and the secondary database system 510, while processes within the secondary database system 510 itself prohibit execution of any requests that require a write transaction upon the secondary database system while it is in backup mode. Management of load balancing of the workload required by a client application executing at client 515 may be managed by the client 515 application itself. Alternatively, a client 515 application may submit a query request to the primary database system 505. A process control 555 load balancing process executing on processor 545 then may determine where the query should be executed and replies to the client 515 with instructions identifying which system the client 515 should issue the query to.

Primary database system 505 may include an in-memory database in which substantially all actively used data may be kept and maintained in main memory 535 so that operations can be executed without disk I/O, which requires accessing disk storage. Active operations of applications within processing control 555 may cause processor 545 to read and write data into main memory 535 or to disk in the persistence layer 565. Processing control 505 applications may also cause processor 545 to generate transaction logs for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery.

Primary database system 505 may be the primary operational system for providing the various functionality necessary to support 24/7 operations. Secondary database system 510 may be a hot-standby, ready to come online with minimal recovery time so as to minimize downtime. Secondary database system 510 may be an identical physical system as primary database system 505, and may be configured in a substantially identical manner in order to enable the secondary database system 510 to provide all the same functionality as primary database system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary database system 510 may also include an in-memory database kept and maintained primarily in main memory 540.

Primary database system 505 and secondary database system 510 differ in that all requests, from client 515 or otherwise, that require a write transaction are executed only in primary database system 505. Primary database system 505 and secondary database system 510 further differ in that all write transactions are prohibited by the secondary database system 510. In order to propagate changes to the data or the underlying schema from the primary database system 505 to the secondary database system 510, processor 545 also replicates 530 transaction logs directly to the process control 560 of the secondary database system 510. Process control 560 includes one or more applications that cause processor 550 to then replay the transaction logs replicated from the primary database system 505, thereby replaying the transactions at the secondary system 510. As transaction logs are replayed, the various transactions executed at the primary database system become reflected (e.g., replayed) in the secondary database system 510. Transaction logs may be replicated in different ways (e.g., synchronously or asynchronously).

For example, where maintaining a secondary database system in as close to the same state as the primary database system is an important factor, logs may be replicated synchronously meaning that the primary system will not commit a transaction until the secondary successfully responds to the log replication. One appreciates that this will slow performance of the primary system. Conversely, where performance of a primary database system is a priority, logs may be replicated asynchronously, in which case the primary operation proceeds with committing transactions without waiting for a response. Various tradeoffs can be made between these two scenarios to achieve a proper level of performance while ensuring replication of critical data.

In some embodiments, the requests that require write transactions may be divided into two groups—data definition language (DDL) queries and data manipulation language (DML) queries. DDL queries may involve the creation, deletion and/or setup of data objects (e.g., tables, portions of tables, columns, etc). DML queries may involve any combination of inserting new data (e.g., one or more rows/columns of data), updating data (e.g., modifying an existing row/column of data), and/or deleting data (e.g., removing one or more rows/columns of data). Other types of requests/queries may also exist. In some embodiments, DDL queries may be more complex than DML queries. For example, the creation of a new table may be implemented as several log records (i.e., sub-operations) as opposed to a single record on the log. An additional discussion of DDL queries is described in related Indian Provisional Application No. 201641040718, filed on Nov. 29, 2016 and U.S. application Ser. No. 15/409,234 filed on Jan. 18, 2017. Both of these related applications are herein incorporated by reference in their entirety.

As illustrated in FIG. 5, each database system includes a main memory 535, 540 and a persistence layer 565, 570. The main memory 535, 540 may include multiple logical stores. For example, the main memory 535, 540 may include a main portion optimized for read operations and a delta portion optimized for write operations. The persistence layer 565, 570 may also include multiple logical stores. For example, the persistence layer may include data volumes 575, 580 to store data volumes in a persistent state and log volumes 585, 590 to store the log data. Requests received by the database system 505, 510 may operate on the main memory 535, 540.

As discussed above, to maintain a secondary database system in the same state as the primary database system, log replication 530 may occur. In some embodiments, such as when the secondary database system 510 is only being used as a back-up database system, it may be sufficient to replicate data in the persistence layer 570 of the secondary database system 510 (e.g., replay the logs in the data volume 580). In this manner, if data recovery is necessary, such as after a restart or crash, the data in the secondary database system 510 can be restored to the main memory 540 from the data volumes 580 in the persistence layer 570. Ongoing log replication 530 into the main memory 540 is not necessary.

However, in a HA and/or load balancing operation when the primary database system 505 and the secondary database system 510 are both responding to requests, it is not sufficient to merely maintain the data volumes 580. In a load balancing operation, the main memory 540 of the secondary database system 510 must also be maintained in a current state so active users (e.g., read requests) can read the data from the main memory 540. Replay of the transaction logs at the secondary database system 510 should also persist any data committed in the primary database system to persistence layer 570 to be stored by data volumes 580. Replay of the transaction logs at the secondary database system 510 may also result in the transaction logs being persisted in log volumes 590.

As discussed above, some requests (e.g., DDL queries) may be implemented as multiple records or sub-operations on the transaction log. DDL operations may be executed in different contexts—a runtime operation, a restart/recovery operation, and a system replication (continuous replay) operation. During the runtime operation, the query is executed on the primary database system 505 and subsequent queries are serialized relative to the query. In the restart/recovery operation, no queries are being received by the database system because it is being restored. Accordingly, subsequent requests do not interfere with earlier requests. However, in the continuous replay context (e.g., during load balancing operation) concurrent queries may be permitted on the secondary database system 510 and the replay of the transaction log on the secondary database system 510 may interfere with these concurrent queries. For example, without synchronization and serialization, a DDL query that takes several sub-operations to complete during replay may not be complete before a concurrent query arrives for execution on the secondary database system 510. Accordingly, a client query may attempt to read a database that is not up to date or in the midst of being changed. In some embodiments, a lock-out mechanism may be employed to address this type of issue such that concurrent read operations are prevented while the transaction log replay is modifying the data in the secondary database. However, this type of logic requires additional complexity to be added to the transaction log such that the group of sub-operations or records are considered a single DDL operation context. A formal DDL Operation context definition may not be available for a transaction log because the additional complexity may not be desirable as it may degrade performance (e.g., speed) of the log replay operation. So the log replay operation may not have such a feature.

Accordingly, a less complex synchronization mechanism may be desirable. In some embodiments, when the primary database system 505 writes a DDL request to a transaction log, it may begin by inserting a query start marker/record (DDLStart). Next, the operations corresponding to the DDL query may be written to the transaction log. Lastly, at the completion of the DDL query operations, an end marker/record (DDLEnd) may be inserted into the transaction log. In some embodiments, a DDL Operation Scope object may be used. The lifetime of the DDL Operation Scope object on the DDL Operation thread stack may control the writing of the DDLStart and DDLEnd transaction log records, such that regardless of whether the DDL operation thread exits normally or abnormally, the DDLEnd is always be written. That is, the DDL Operation scope object is inherently destroyed with the DDL Operation thread context. The transaction log is sent to the secondary database system 510 and replayed on the secondary database system 510. During continuous replay on the secondary database system 510, the markers in the transaction log can be identified by the processor 550 and the processor 550 can maintain an object/lock to provide synchronization of the replay of DDL sub-operation transaction log records. Accordingly, when the marker DDLStart is identified, the processor 550 stores the marker in a memory and maintains a lock state to ensure proper serialization of the of the DDL sub-operations. When the DDLEnd marker is replayed, the lock is terminated.

Figure 6:
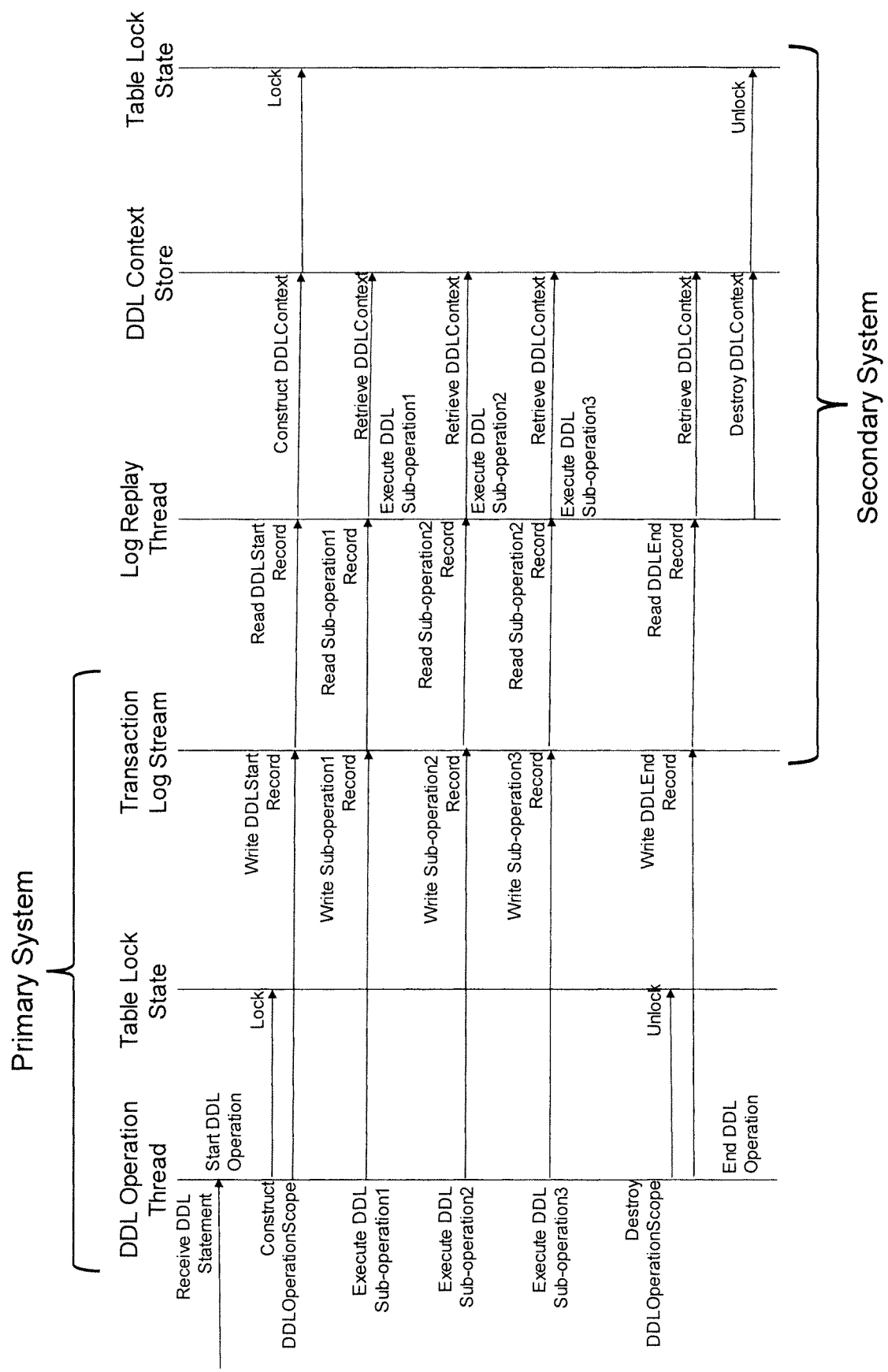
FIG. 6 is a schematic diagram illustrating an exemplary operation of a system for updating a secondary database system.

FIG. 6 is a schematic diagram illustrating an exemplary operation of a system for updating a secondary database system in more detail. As illustrated in FIG. 6, a DDL Statement is received at the DDL Operation Thread to start the DDL operation on the primary database system. The Table Lock State is updated to a lock state and a DDL Operation Scope is constructed. Next, the sub operations are executed and written to the Transaction Log Stream. In the example in FIG. 6, there are three (3) DDL sub-operations and a corresponding three (3) records are written to the Transaction Log Stream. On the secondary database system, the log replay thread, reads the DDLStart record, constructs a DDL Context and updates the table lock state to be locked. Next the three (3) DDL sub-operations are read from the Log Replay Thread, the DDL Contex is read from the DDL Context Store and the DDL sub-operations are executed on the secondary database system. After executing the DDL sub-operations on the primary database server, the Table Lock State on the primary database server is returned to an unlocked state to end the DDL Operation. The DDLEnd record is written to the Transaction Log Stream and read by the Log Replay Thread on the secondary database system. Next, the DDL Context is retrieved from the DDL Context Store, the DDL Context is destroyed and the Table Lock State on the secondary database system is returned to an unlocked state. In some embodiments, since the secondary system merely replays one record after another without any command context, the DDL Context Store on the secondary database system may provide the necessary context by storing the DDL context in memory. Although the embodiment described with respect to FIG. 6, illustrates the secondary database system replaying the transaction log upon receipt of the information, in some embodiments, the secondary database system may read from the transaction log stream at some time after the primary database system writes to the transaction log stream.

Since the DDL operation may include several sub-operations, it is possible that other events may occur during the DDL operation. One such event is a savepoint event. In a savepoint event, a snapshot of the data (e.g., the tables and associated information) within the database system may be created so that it can be used at a later time for initialization of the database system (e.g., after a failure). In some embodiments, the savepoint operation may be performed periodically (or manually) on the primary system such that a recent snapshot of the database is stored in the persistence layer 565 of the primary database system 505 and available at a later time if necessary. For example, if there is a database system crash or similar event the information stored in main memory may be lost. Therefore, the database system may need to be reinitialized by loading the most recent snapshot of the database into the main memory and then replaying the log records since the savepoint operation. For example, if the secondary database system 510 is being initialized, primary database system data may be shipped to the secondary database system 510 to serve as a starting point for recovering the database on the secondary database system 510. The primary database system data may include two parts—the data store and the transaction log. The data store may be the most recent snapshot and the transaction log may be a log of all the transactions beginning immediately after the savepoint operation. Accordingly, the current state of the secondary database system 510 can be recovered by replaying the changes from the transaction log on the last system savepoint or snapshot.

In some embodiments, the log transactions existing before the savepoint may be deleted from the transaction log when the savepoint operation occurs. In other words, a new empty transaction log may effectively be created during a savepoint operation. In some embodiments, this approach may be desirable to maintain simplicity of the transaction log, maintain the speed of the log replay, and/or minimize the amount of memory occupied by the transaction log. As described above, in some embodiments, speed and simplicity of the transaction log may be desirable features.

In some instances the savepoint operation may occur during a DDL operation. If this occurs, the new transaction log may only contain a portion of the operations necessary to replay a DDL operation on the secondary database system 510. In the event of an initialization based on this savepoint, the primary database system 505 may be capable of simply replaying the DDL operation from the primary's transaction log. However, on the secondary database system 510, this may not be possible because the DDLStart record may not be present in the transaction log (e.g., the savepoint operation may occur after executing sub-operation 1 illustrated in FIG. 6). Accordingly, the DDL Context cannot be created to place the secondary database system 510 into a locked state. As a result, the lock state needs to be persisted and transferred to the secondary database system 510 in another way.

While it may be possible to simply retain the transaction log information after a savepoint, this solution would require that additional storage space and additional complex logic be added to the log replay logic to enable the secondary database system 510 to identify and access previous transactions. Alternatively, the in-progress DDL operation state of the secondary database system 510 may be persisted in memory during a savepoint operation. This additional information could be stored in a new savepoint log that could be replayed during initialization to return the secondary database system 510 to the correct state before replaying the transaction log. Once again, this is a complex solution and requires that additional information be persisted into memory.

In some embodiments, the in-progress DDL operation state may be maintained as part of the metadata associated with the table information in the database. As a result, the necessary state information may be persisted automatically during a savepoint operation. For example, in an HA/DR system each column store table object may have a corresponding table container object and associated metadata. The state information may be stored in a table container directory (i.e., a directory of tables) associated with the relevant table objects. Since only a single DDL operation at a time can run on a table container, only state information for one DDL operation per table would need to be persisted. Accordingly, the container directory metadata could easily contain the necessary DDL operation state (e.g., an IndexHandle State). In some embodiments, the state information may be represented by a 32 bit unsigned integer or similar structure. In some embodiments, the metadata records may have spare storage available that could be used for this information. In this case, the new persistence field may be added to the existing table container directory object definition and existing spare space within the object definition may be used to store (persist) the IndexHandle state for an open DDL operation on a column store table.

Figure 7:
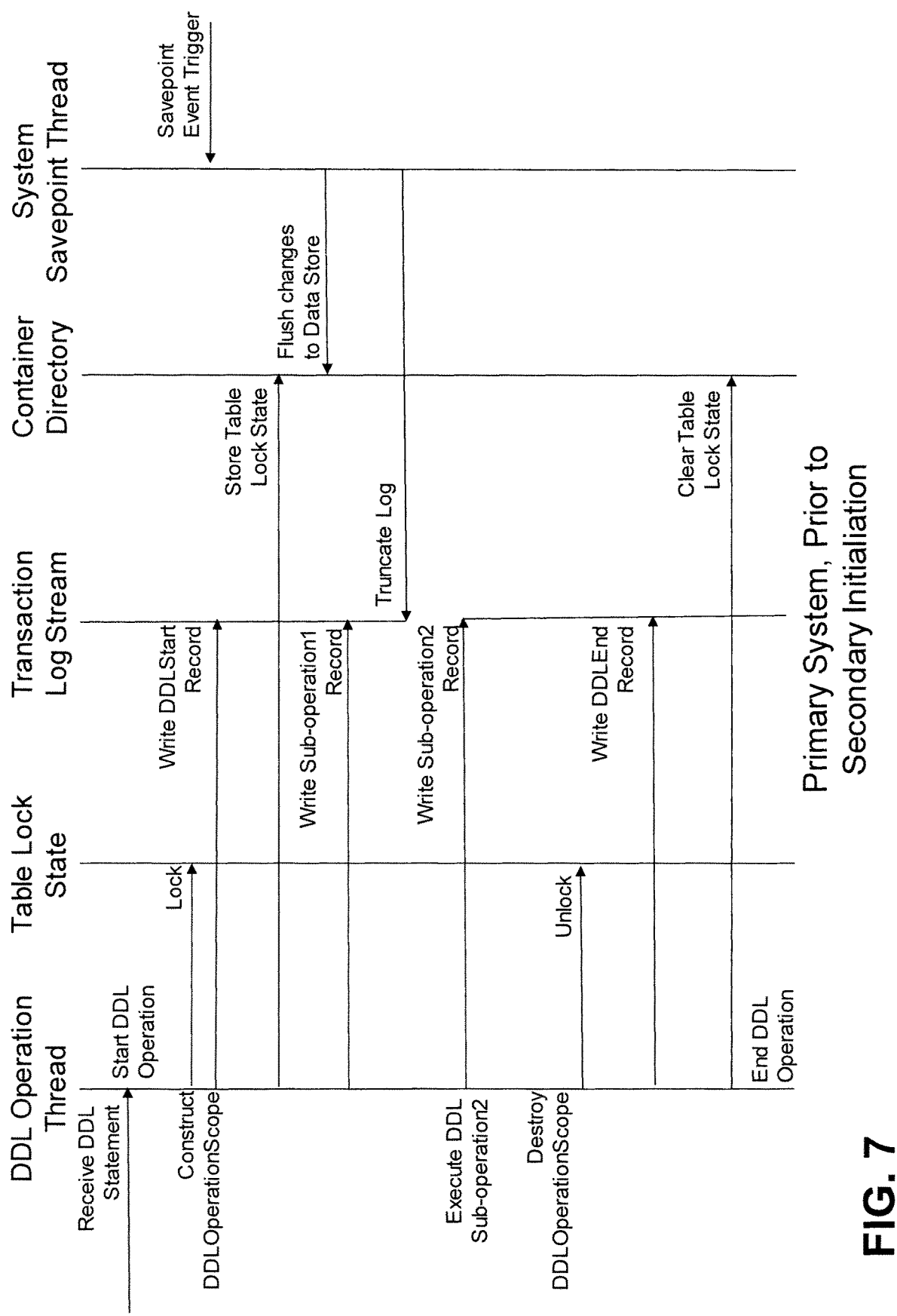
FIG. 7 is a schematic diagram illustrating an exemplary operation of a primary database system prior to initialization of a secondary database system.

FIG. 7 is a schematic diagram illustrating an exemplary operation of a primary database system prior to initialization of a secondary database system. As illustrated in FIG. 7, a DDL Statement is received at the DDL Operation Thread to start the DDL operation on the primary database system. The Table Lock State is updated to a lock state and a DDL Operation Scope is constructed. Next, a DDLStart Record is written to the Transaction Log Stream and the Table Lock State is stored in the Container Directory. Next, the sub operations are executed and written to the Transaction Log Stream in a manner similar to that illustrated with respect to FIG. 6. In the example in FIG. 7, there are two (2) DDL sub-operations and a corresponding two (2) records are written to the Transaction Log Stream. After executing the DDL sub-operations on the primary database server, the Table Lock State on the primary database server is returned to an unlocked state and the DDLEnd record is written to the Transaction Log Stream. Additionally, the Table Lock State is cleared from the Container Directory.

As further illustrated in FIG. 7, the System Savepoint Thread may execute a Savepoint Event Trigger during execution of the DDL operation on the primary database system 505. The Savepoint Event Trigger causes the data stored in memory, including the Table Lock State is stored in the Container Directory to be persisted to the data volumes 575 on the primary database system 505. Once this is complete, the Transaction Log Stream is truncated and a new Transaction Log Stream begins. As a result, the new Transaction Log Stream in this example only contains the Sub-operation 2 record and the DDLEnd record. The DDLStart record and Sub-operation 1 records are lost. The data volumes 575 contain a snapshot of the data at a point in time just before the log is truncated. That is the snapshot contains the underlying table data as well as the metadata contained in the Container Directory (including e.g., the Table Lock State).

Figure 8:
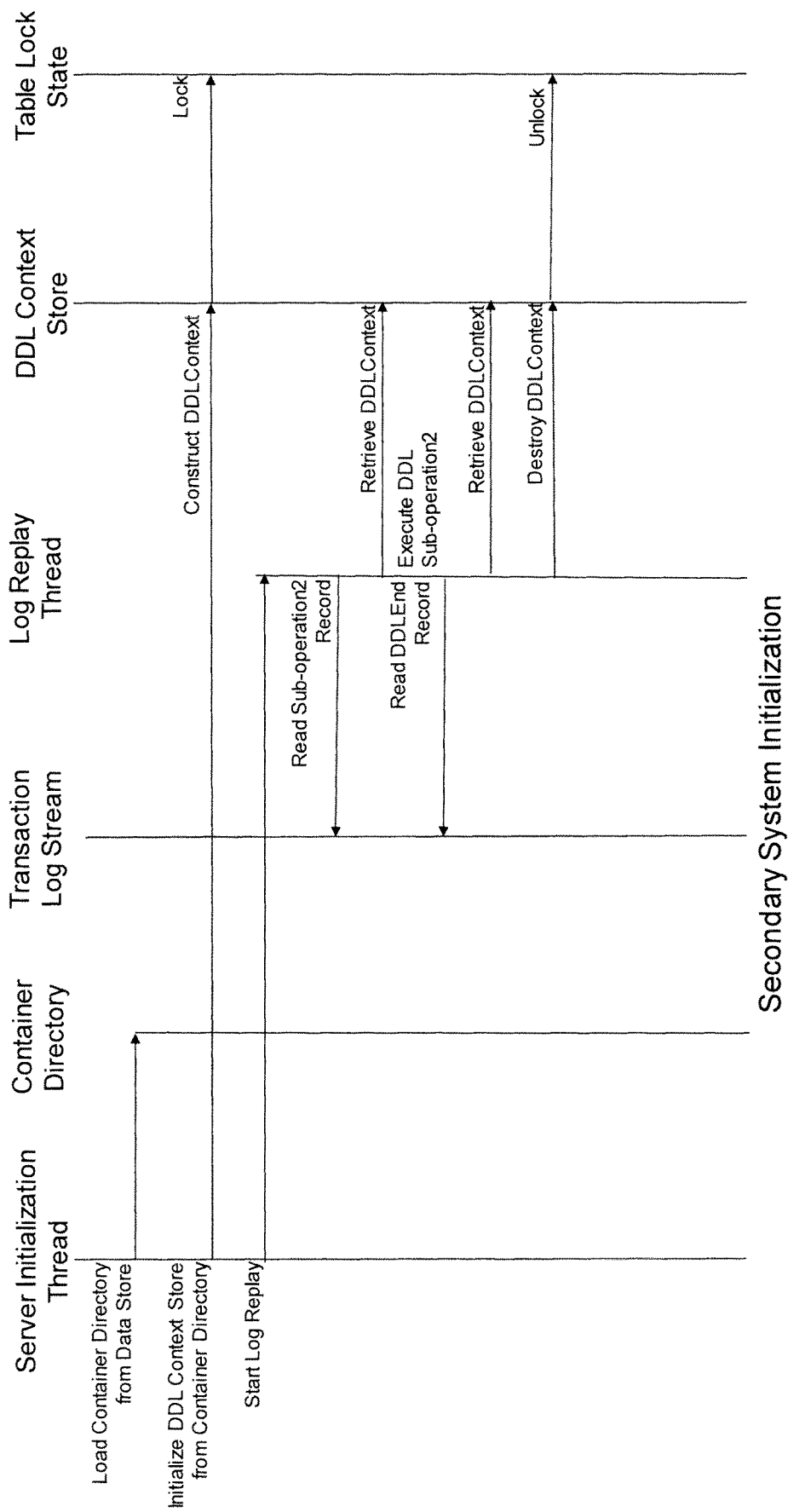
FIG. 8 is a schematic diagram illustrating an exemplary operation of a secondary database system during initialization.

FIG. 8 is a schematic diagram illustrating an exemplary operation of a secondary database system during initialization. In FIG. 8, the secondary database system 510 is being initialized at some time after the savepoint event illustrated in FIG. 7 but before any subsequent savepoint event. After the table objects are loaded (not shown), the Container Directory is loaded from the Data Store and the Table Container Directory is read to produce a list of tables with open DDL operations at the time of the savepoint event. The list of tables may include the table names and the IndexHandle state of the corresponding DDL operation. This list is then used to initialize the DDL Context Store, construct a DDL Context at the DDL Context Store and update the table lock state to be locked. In other words, by using the IndexHandle state information, the secondary database system 510 is able to create a locked Table Lock State without the DDLStart record, as illustrated in FIG. 6

Once the Table Lock State is locked, the transaction log is replayed. In this example, the transaction log replay begins with DDL sub-operation 2 followed by the DDLEnd record. Next, the DDL Context is destroyed and the Table Lock State on the secondary database system is returned to an unlocked state. If there are additional records that need to be replayed during initialization, those records are also replayed in the normal manner—e.g., one record after another is replayed without any command context.

Figure 9:
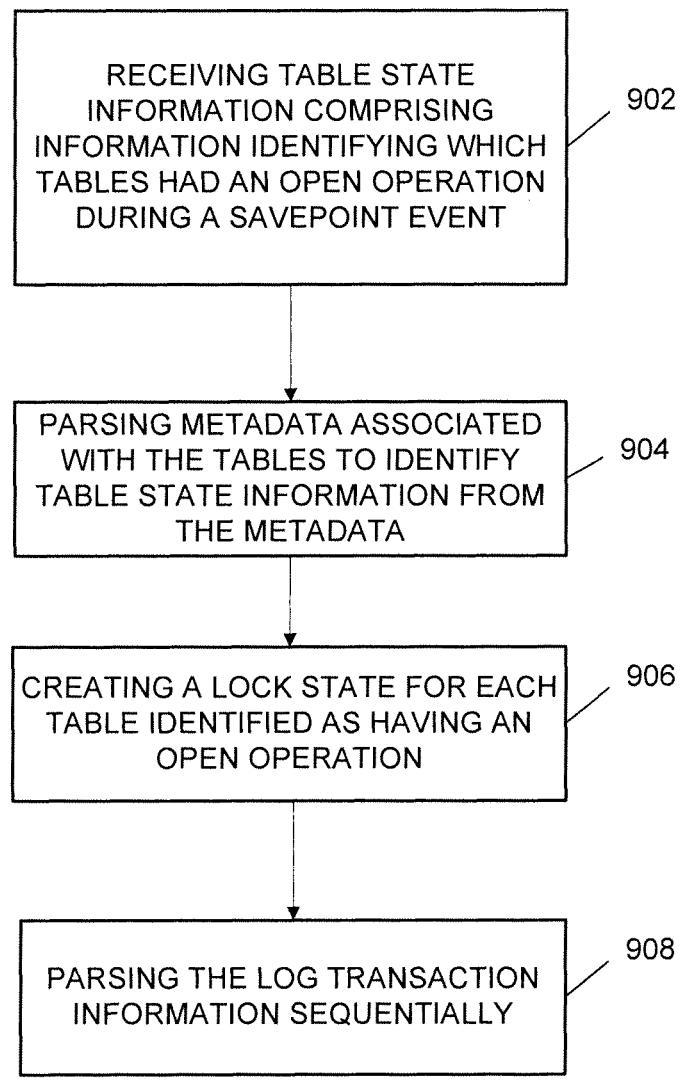
FIG. 9 is a flowchart illustrating an exemplary operation of a secondary database system during initialization.

FIG. 9 is a flowchart illustrating an exemplary operation of a secondary database system during initialization. In some embodiments, the method described in FIG. 9 may be performed by the secondary database system 510 during initialization. In operation 902, the second database system 510 receives table state information comprising information identifying which (if any) tables had an open operation (e.g., a DDL operation) during the savepoint event that created the savepoint (snapshot) being used to initialize the second database system 510. As discussed above, the table state information may be included in the metadata associated with the table container in the table container directory. The operation may be a DDL query or some other query that involves multiple sub-operations. In operation 904, the secondary database system 510 parses metadata associated with the tables to identify table state information from the metadata parses the state information. In operation 906, the secondary database system 510 creates a lock state for some or all of the tables identified as having an open operation. In operation 908, after the lock state has been applied, the secondary database system 510 parses the log transaction information sequentially.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
receiving table state information from a primary database system at a secondary database system, the table state information comprising information identifying which tables had an open data definition language (DDL) query during a savepoint event;
parsing metadata associated with the tables to identify table state information from the metadata;
creating, without a record of a start of the DDL query, a lock for each table identified as having an open DDL query during the savepoint event after replaying a corresponding DDL Start (DDLStart) transaction log record;

parsing log transaction information sequentially;
returning a table that is locked to an unlocked state after replaying a DDL End (DDLEnd) transaction log record; and
initializing the secondary database after the savepoint event but before a subsequent savepoint event;
wherein a DDL operation scope object on a DDL operation thread stack controls writing of the DDLStart and DDLEnd transaction log records so that the DDLEnd is always written regardless of how the DDL operation thread exits.

2. The method of claim 1, wherein the savepoint event occurs during execution of an operation comprising a plurality of sub-operations.

3. The method of claim 2, wherein the table state information comprises a 32 bit unsigned integer.

4. The method of claim 1, wherein the log transaction information includes transactions since the savepoint event.

5. The method of claim 1, wherein the log transaction information comprises a transaction to terminate the lock created for each table identified as having an open operation during the savepoint event.

6. The method of claim 1, wherein the method is executed during initialization of the secondary database system.

7. The method of claim 1, wherein the log transaction information is generated by the primary database system based on queries received by the primary database system since the savepoint event.

8. The method of claim 1, wherein the primary database system and the secondary database system are configured to operate in a load balancing operation.

9. The method of claim 1, wherein the primary database system and the secondary database system are in memory database (IMDB) systems and the secondary database system is configured as a back-up database system.

10. The method of claim 1, wherein the primary database system and the secondary database system are column oriented database systems.

11. A system comprising:
a processor; and
a non-transitory computer readable media having computer executable instructions stored therein, which, when executed by the processor, causes the system to perform operations comprising:
receiving table state information from a primary database system at a secondary database system, the table state information comprising information identifying which tables had an open data definition language (DDL) query during a savepoint event;
parsing metadata associated with the tables to identify table state information from the metadata;
creating, without a record of a start of the DDL query, a lock for each table identified as having an open DDL query during the savepoint event after replaying a corresponding DDL Start (DDLStart) transaction log record;
parsing log transaction information sequentially;
returning a table that is locked to an unlocked state after replaying a DDL End (DDLEnd) transaction log record; and
initializing the secondary database after the savepoint event but before a subsequent savepoint events;
wherein a DDL operation scope object on a DDL operation thread stack controls writing of the DDLStart and DDLEnd transaction log records so that the DDLEnd is always written regardless of how the DDL operation thread exits.

12. The system of claim 1, wherein the savepoint event occurs during execution of an operation comprising a plurality of sub-operations.

13. The method of claim 12, wherein the table state information comprises a 32 bit unsigned integer.

14. The system of claim 11, wherein the log transaction information includes transactions since the savepoint event.

15. The system of claim 11, wherein the log transaction information comprises a transaction to terminate the lock created for each table identified as having an open operation during the savepoint event.

16. The system of claim 11, wherein the method is executed during initialization of the secondary database system.

17. The system of claim 11, wherein the log transaction information is generated by the primary database system based on queries received by the primary database system since the savepoint event.

18. The system of claim 11, wherein the primary database system and the secondary database system are configured to operate in a load balancing operation.

19. The system of claim 11, wherein the primary database system and the secondary database system are in memory database (IMDB) systems and the secondary database system is configured as a back-up database system.

20. The system of claim 11, wherein the primary database system and the secondary database system are column oriented database systems.

* * * * *